(12) United States Patent
Erdlopff

(10) Patent No.: US 11,919,252 B2
(45) Date of Patent: Mar. 5, 2024

(54) JOINING METHOD WHILE PRODUCING AN IMPROVED HEAT-STAKED RIVET CONNECTION

(71) Applicant: PREH GMBH, Bad Neustadt a. d. Saale (DE)

(72) Inventor: Dirk Erdlopff, Fulda (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 150 days.

(21) Appl. No.: 17/217,359

(22) Filed: Mar. 30, 2021

(65) Prior Publication Data

US 2021/0316515 A1    Oct. 14, 2021

(30) Foreign Application Priority Data

Apr. 8, 2020   (DE) ...................... 10 2020 109 908.8

(51) Int. Cl.
*B32B 7/08*      (2019.01)
*B29C 65/00*     (2006.01)
(Continued)

(52) U.S. Cl.
CPC ...... *B29C 66/30325* (2013.01); *B29C 65/606* (2013.01); *B29C 66/30321* (2013.01);
(Continued)

(58) Field of Classification Search
CPC ......................... B29C 66/30325; B29C 65/606
See application file for complete search history.

(56) References Cited

U.S. PATENT DOCUMENTS 5,310,434 A * 5/1994 Vives ...................... F16B 4/004
156/92
10,099,423 B2 * 10/2018 Wang .................. B29C 66/7392
(Continued)

FOREIGN PATENT DOCUMENTS

CN       1914026 A     2/2007
DE       1778433 A1    10/1971
(Continued)

OTHER PUBLICATIONS

German Notice of Examination for German Application No. 102020109908.8, German Patent and Trademark Office (DPMA), dated Mar. 7, 2022.
(Continued)

*Primary Examiner* — William P Watkins, III
(74) *Attorney, Agent, or Firm* — M&B IP Analysts, LLC

(57) ABSTRACT

A method for joining a first component with a second component includes providing a first component with a thermoplastic rivet; providing a second component having a rivet hole, wherein the rivet hole forms a rivet hole inlet in a first surface of the second component and a rivet hole outlet in a second surface of the second component, and wherein the second component forms in the second surface a structured rivet head accommodating portion disposed in a region of the rivet hole outlet; inserting a free end of the rivet via the rivet hole inlet into the rivet hole until a unilaterally abutting, inserted position of the rivet reaching through the rivet hole is reached; and heat staking the free end of the rivet in the inserted position while forming a rivet head, so that the rivet head is at least partially accommodated in the rivet head accommodating portion.

13 Claims, 3 Drawing Sheets

(51) Int. Cl.
*B29C 65/60* (2006.01)
*B29L 31/30* (2006.01)

(52) U.S. Cl.
CPC .............. *B29C 66/71* (2013.01); *B32B 7/08* (2013.01); *B29L 2031/3041* (2013.01); *Y10T 428/24339* (2015.01)

(56) References Cited

U.S. PATENT DOCUMENTS

2003/0116885 A1* 6/2003 Lessard ............... B29C 66/8322
264/249
2012/0275972 A1 11/2012 Schoen et al.
2017/0361540 A1* 12/2017 Li ........................ B29C 66/742

FOREIGN PATENT DOCUMENTS

| DE | 102016102846 A1 | 9/2016 |
| DE | 102016108290 | 8/2017 |
| WO | 2011042422 A1 | 4/2011 |

OTHER PUBLICATIONS

"First Office action for application 202110378595.4", dated Sep. 5, 2022. China National Intellectual Property Administration. Beijing, China.

\* cited by examiner

JOINING METHOD WHILE PRODUCING AN IMPROVED HEAT-STAKED RIVET CONNECTION

This application claims priority to the German Application No. 10 2020 109 908.8, filed Apr. 8, 2020, now pending, the contents of which are hereby incorporated by reference.

The present disclosure relates to a method for joining two components, at least one of which, for example, is a thermoplastic part, in order thus to build from individual parts larger supporting structures as they are required, for example, in the construction of automobiles.

In automotive engineering, large numbers of plastic components are used for instrument panels, center consoles or door trims, or even for individual operating members. Often, very different components need to be joined together for this purpose. Apart from welding, gluing, screwing, and snap-fitting are known as joining methods.

Even amongst the welding methods, it is possible to choose from ultrasound, infrared or hot plate welding, depending on the component. If the components are to be connected so as to be very closely adjacent to each other, a so-called heat staking process has to be used. In heat staking, the two components may lie on top of each other, wherein one of the components has to have a rivet, which is also referred to as a rivet dome, made of thermoplastic synthetic material, which is guided through a rivet hole of the other component. The rivet is heated by means of hot air, laser irradiation, infrared radiation, or a heated rivet head stamp, and then formed in such a way that a rivet head is formed, and the two plastic parts are then connected to each other in a more or less positive manner. Since it is only the rivet that needs to be heated, the surfaces may then also be used for a decoration.

Because of the loss of material, which is also referred to as material shrinkage, the material thickness of the rivet dome is reduced as it cools off, which results in the connection having play in the direction perpendicular to the dome insertion direction and the component possibly being only loosely connected, which may lead to rattling noise that is disadvantageously perceptible in the vehicle interior. Methods in which, in addition to heat staking, the components are connected by substance-to-substance connection by means of heat welding, are also known from DE 10 2016 108 290 B3. This puts an additional strain on the components and may have a negative effect on the surface contour of the components. Moreover, a substance-to-substance connection cannot be realized by means of a thermal welding method if the component having the rivet hole does not consist of a thermoplastic, but of a metal, for instance, or has a metallic coating in the region adjacent to the rivet hole. The use of such metal-coated components, such as chrome-plated components, is popular for trims or operating parts of motor vehicles.

Against this background, the disclosure provides a method for joining two components in which a rivet connection, which is improved as regards durability and strength, is produced by heat staking, and in which this is also accomplished if a substance-to-substance connection between the two components is not obtained because, for example, the region of the component adjacent to the rivet hole associated with the rivet connection is metal-coated. This object is achieved by a method of claim 1. A correspondingly advantageous assembly and use are each the subject matter of the independent claims. Advantageous embodiments are the subject matter of the respectively dependent claims. It is to be noted that the features cited individually in the patent claims can be combined in any technologically meaningful manner and present other embodiments of the disclosure. The description, particularly in connection with the figures, additionally characterizes and specifies the disclosed embodiment.

The embodiment relates to a method for joining a first component with a second component. A first component with at least one thermoplastic rivet is provided in a first providing step. A second component having a rivet hole is provided in a second providing step, wherein the rivet hole defines a rivet hole inlet in a first surface of the second component and a rivet hole outlet in a second surface of the second component. The second component further forms in the second surface a structured rivet head accommodating portion disposed in the region of the rivet hole outlet. The term component is to be interpreted broadly in each case. For example, it is a housing or panel component, or an operating member component. The rivet is a pin having a round cross section, for example, which is surrounded by an abutting surface intended for abutting against the second component and protrudes from it. At least the rivet is formed, for example, from acrylonitrile butadiene styrene (ABS), polyamide (PA), polylactate (PLA), polymethyl methacrylate (PMMA), polycarbonate (PC), polyethylene terephthalate (PET), polyethylene (PE), polypropylene (PP), polystyrene (PS), polyether ether ketone (PEEK) or polyvinyl chloride (PVC) or combinations thereof. Preferably, the first component is formed entirely from a thermoplastic material. For example, the second component is formed from a plastic, metal or combinations thereof. The second component preferably is a metal-coated, such as electroplated, body consisting of a thermoplastic material.

In an inserting step of the method according to the embodiment, a free end of the rivet is inserted into the rivet hole inlet until a unilaterally abutting, inserted position of the rivet reaching through the rivet hole has been reached. The abutting position is the result, for instance, of the abutting surface of the first component abutting against the first surface of the second component surrounding the rivet hole inlet.

In a subsequent step of the joining method according to the embodiment, the free end of the rivet is heat-staked in the inserted position while forming a rivet head, so that the rivet head is formed by deforming the free end, and is accommodated in the rivet head accommodating portion, in order to finally fix the second component to the first component. For example, the heat staking is carried out by indirectly heating the rivet by means of a heated stamp being in touching contact with the free end, wherein the stamp is heated by hot air or heat radiation, or by the free end of the rivet being directly heated by hot air, ultrasound, or heat radiation. The structure in the rivet head accommodating portion ensures that the rivet head is additionally fixed to the second component without a substance-to-substance connection between the rivet and the second component being required. For example, the rivet is non-rotatably fixed by the structure. For example, the structure is a singular recess or a singular tooth or a toothing with a sequence of teeth and interposed tooth troughs. In this way, a connection is produced even if the second component is made from a material that cannot be thermally connected by substance-to-substance connection with the thermoplastic material of the rivet, or only with great difficulty, or if at least the rivet head accommodating portion or the second surface including the rivet hole outlet has a corresponding coating, such as a metallic coating.

It is preferably provided that the rivet head accommodating portion forms a molding tool, also referred to as molding cavity, during heat staking, so that the rivet head is positively accommodated in the structured rivet head accommodating portion. During heat staking, the optionally metallic coating of the second component serves for heat dissipation in order to avoid thermal deformation.

It is preferably provided that the structured rivet head accommodating portion and the heat-staked rivet head form a spline connection. For example, a wavy spline, serrated spline, wedge-shaped spline, or involute spline are provided. For example, it is formed circumferentially around the rivet hole outlet.

According to a preferred embodiment, the rivet head accommodating portion is formed so as to be conically tapering in the direction of the rivet hole inlet, in order to obtain the biased and thus non-positive fixing of the second component on the rivet of the first component between the rivet head and the abutting surface, which is caused by the material shrinkage when the thermoplastic rivet or rivet head solidifies.

In order to cause additional clamping in the opposite direction, the rivet, according to a preferred embodiment, has a base portion tapering conically in the direction of its free end or in the direction of its rivet head, which cooperates, for example, with an inner circumferential surface of the rivet hole formed in a complementary manner. For example, the base portion is formed in the region of the rivet provided between the abutting surface and the rivet head.

Preferably, the rivet head accommodating portion is formed by a depression surrounding the rivet hole outlet in the second surface of the second component and, after heat staking, the rivet head is accommodated in the depression in its entirety and preferably flush with the second surface in order to avoid mechanical damage to the otherwise protruding rivet head or to attain a visually attractive appearance.

The embodiment further relates to an assembly of a first component and a second component fixed to the first component. In this case, the first component has a thermoplastic rivet. The second component has a rivet hole. The rivet hole defines a rivet hole inlet in a first surface of the second component and a rivet hole outlet in a second surface of the second component. According to the embodiment, a structured rivet head accommodating portion disposed in the region of the rivet hole outlet is formed in the second surface. The rivet is inserted into the rivet hole and disposed so as to reach through the rivet hole, wherein it forms at its free end a rivet head that is at least partially accommodated in the rivet head accommodating portion. The rivet head is, for example, a mushroom-shaped enlarged portion at the free end of the rivet formed by heat staking. For example, the first component forms an abutting surface for the first surface of the second component surrounding the rivet hole inlet, and the second component is fixed between the rivet head and the abutting surface.

The structure in the rivet head accommodating portion ensures that the rivet head is additionally fixed to the second component without a substance-to-substance connection between the rivet and the second component being required. For example, the rivet is non-rotatably fixed by the structure. For example, the structure is a singular recess or a singular tooth or a toothing with a sequence of teeth and interposed tooth troughs. In this way, a connection is produced even if the second component is made from a material that cannot be thermally connected by substance-to-substance connection with the thermoplastic material of the rivet, or only with great difficulty, or if at least the rivet head accommodating portion or the second surface including the rivet hole outlet has a corresponding coating, such as a metallic coating, so that a substance-to-substance connection, at least by means of heating, is precluded.

It is preferably provided that the rivet head is positively accommodated in the structured rivet head accommodating portion. It is preferably provided that the structured rivet head accommodating portion and the rivet head form a spline connection. For example, a wavy spline, serrated spline, wedge-shaped spline, or involute spline are provided. For example, it is formed circumferentially around the rivet hole outlet.

According to a preferred embodiment, the rivet head accommodating portion is formed so as to be conically tapering in the direction of the rivet hole inlet, in order to obtain a biased and thus non-positive fixing of the second component on the rivet of the first component between the rivet head and the abutting surface. In order to cause additional clamping in the opposite direction, the rivet, according to a preferred embodiment, has a base portion tapering conically in the direction of its free end or in the direction of its rivet head, which cooperates, for example, with an inner circumferential surface of the rivet hole formed in a complementary manner. For example, the base portion is formed in the region of the rivet provided between the abutting surface and the rivet head.

Preferably, the rivet head accommodating portion is formed by a depression surrounding the rivet hole outlet in the second surface of the second component, and the rivet head is accommodated in the depression in its entirety and preferably flush with the second surface in order to avoid mechanical damage to the otherwise protruding rivet head or to attain a visually attractive appearance.

Furthermore, the embodiment relates to the advantageous use of the assembly in one of the previously described advantageous configurations in a motor vehicle. For example, the first component is a panel and the second component an operating part of an operating member, wherein the operating part is mounted by means of mounting means so as to be adjustable along an adjustment path, and the panel is fixed to the operating part in order to cover the mounting means.

The embodiment as well as the technical environment will be explained in more detail below with reference to the Figures. It must be remarked that the Figures depict a particularly preferred embodiment of the disclosure, but that the latter is not limited thereto. In the Figures.

Figure 1:
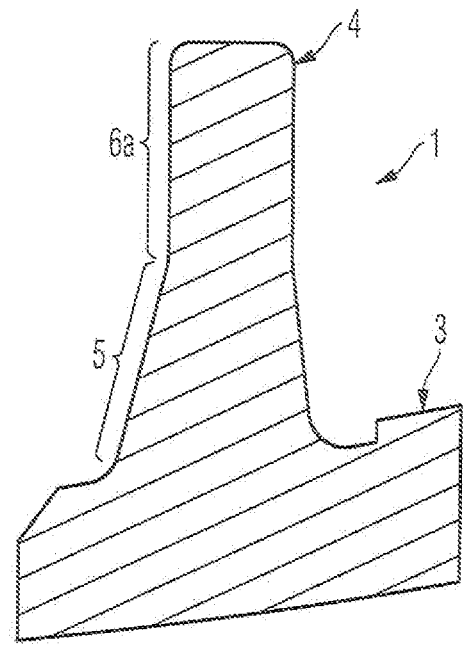
FIG. 1 shows a schematic cross-sectional view through a first component provided in the method according to the embodiment.

FIG. 1 shows a section through the provided first component 1, with only a region of the first component 1 containing the rivet 4 being depicted. The first component 1 is produced entirely from a thermoplastic material and forms a rivet 4 which protrudes in a pin shape from an abutting surface 3 of the first component 1 and has a free end 6a. Between the free end 6a and the abutting surface 3, the rivet 4 forms a conical base portion 5 tapering towards the free end 6a. The first component 1 is formed, together with the rivet 4, in a molding process from the thermoplastic material.

Figure 2:
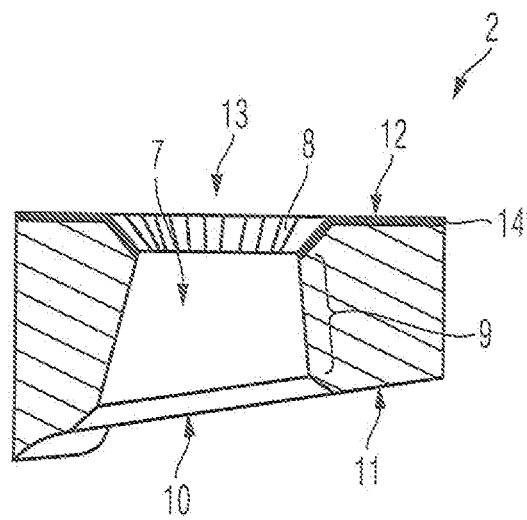
FIG. 2 shows a schematic cross-sectional view through a second component provided in the method according to the embodiment.

FIG. 2 shows the second component 2 provided in the method according to the embodiment. In FIG. 2, only a portion of this component 2 with the region including the rivet hole 7 is shown. The second component 2 is produced from a thermoplastic material in a molding process and is metal-coated in a subsequent coating step, such as a galvanic deposition method, so that it has a metallic layer 14 forming an outer surface of the second component 2. The second rivet hole 7 extends from a first surface 11, in which the rivet hole inlet 10 is formed, to a second surface 12 of the second component, where the rivet hole 7 forms a rivet hole outlet 13 with a rivet head accommodating portion 8. Between the rivet head accommodating portion 8 and the rivet hole inlet 10, the rivet hole 7 is formed so as to conically taper towards the rivet hole outlet 13.

The rivet head accommodating portion 8 is formed by a conical depression expanding outwards, i.e., away from the rivet hole outlet 13; the rivet head accommodating portion 8 has a wave-shaped structure in its surface.

Figure 3:
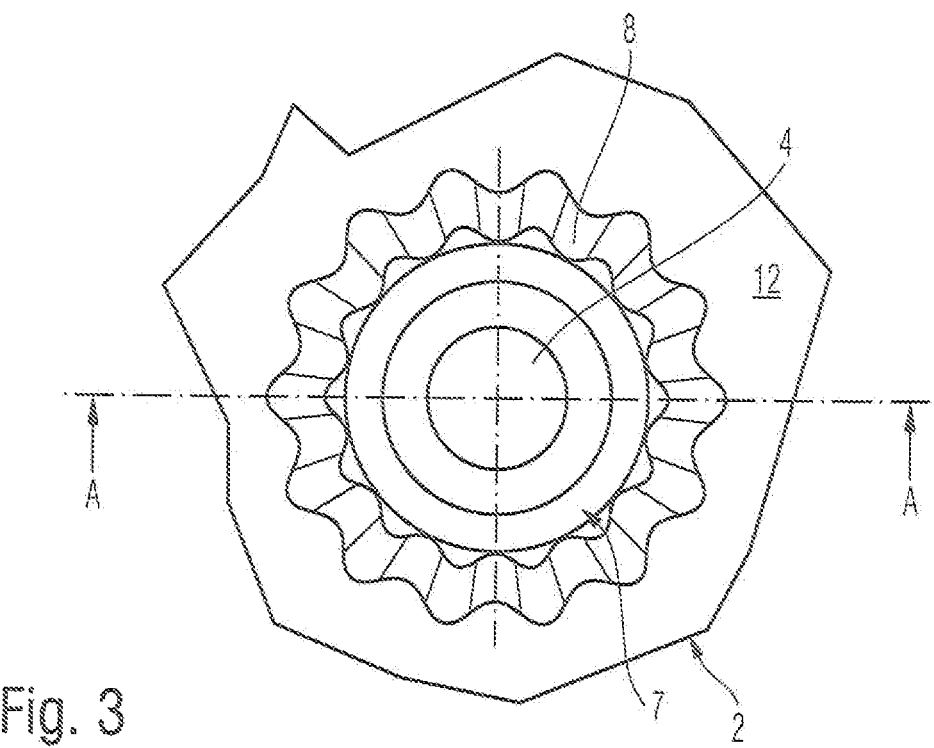
FIG. 3 shows a top view of the rivet of the first component inserted in the method according to the embodiment into the rivet hole of the second component, prior to heat staking the free end of the rivet.
Figure 4:
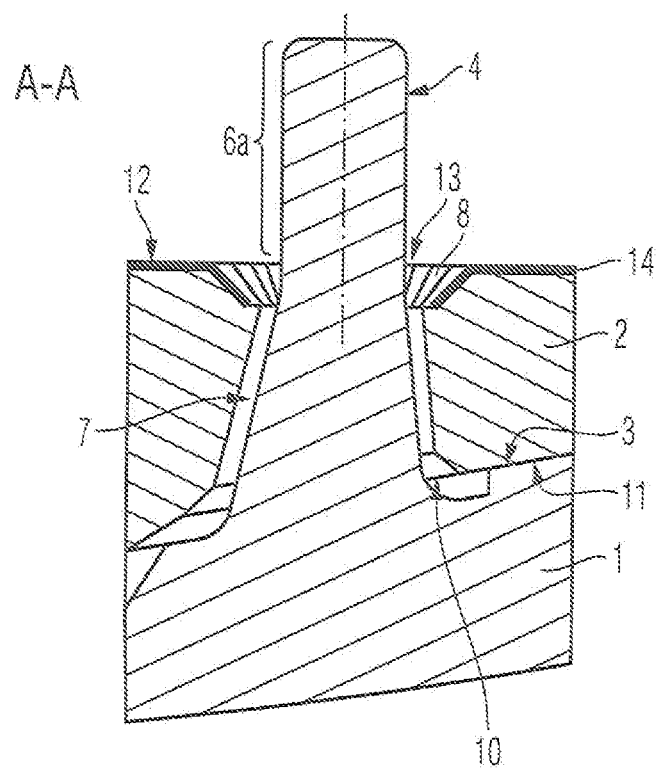
FIG. 4 shows a sectional view associated with FIG. 3.

FIG. 3 shows a top view of the rivet 4 of the first component 1 inserted in the method according to the embodiment into the rivet hole 7 of the second component 2, prior to heat staking the free end 6a of the rivet 4. FIG. 4 is the associated sectional view. Here, the rivet 4 is inserted into the rivet hole 7 to such an extent that the first surface 11 of the second component 2 surrounding the rivet hole inlet 10 comes into abutment against the abutting surface 3 of the first component 1 surrounding the rivet 4, and the free end 6a of the rivet 4 protrudes over the rivet hole outlet 13 and the rivet head accommodating portion 8 provided with the wave-shaped structure.

Figure 5:
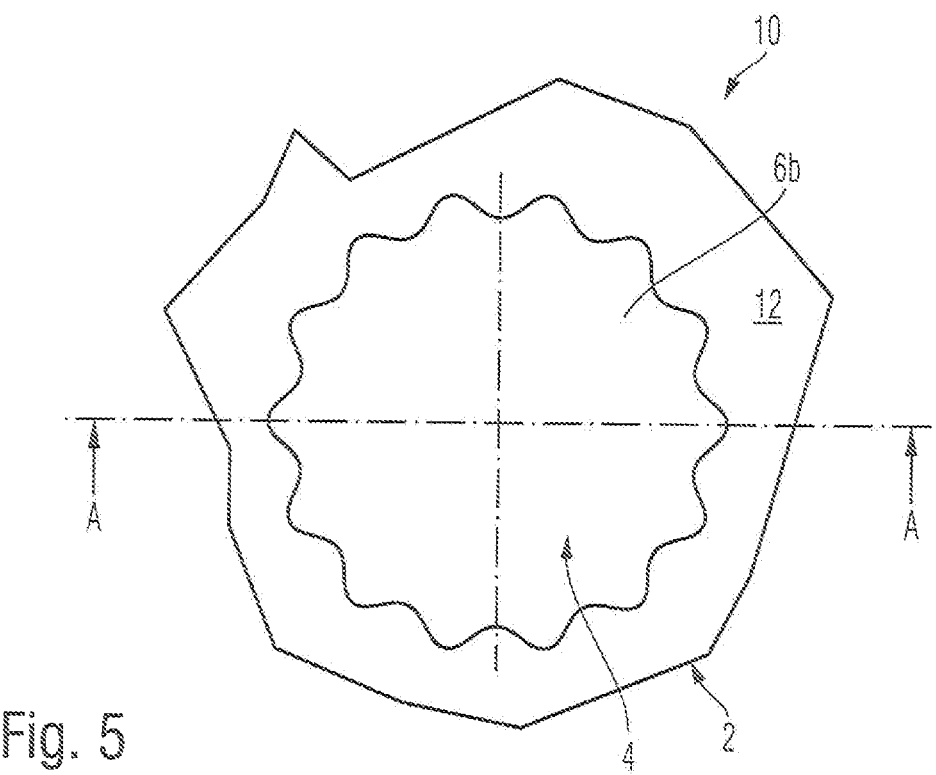
FIG. 5 shows a top view of the rivet of the first component inserted in the method according to the embodiment into the rivet hole of the second component, subsequent to heat staking the free end of the rivet to form a rivet head.
Figure 6:
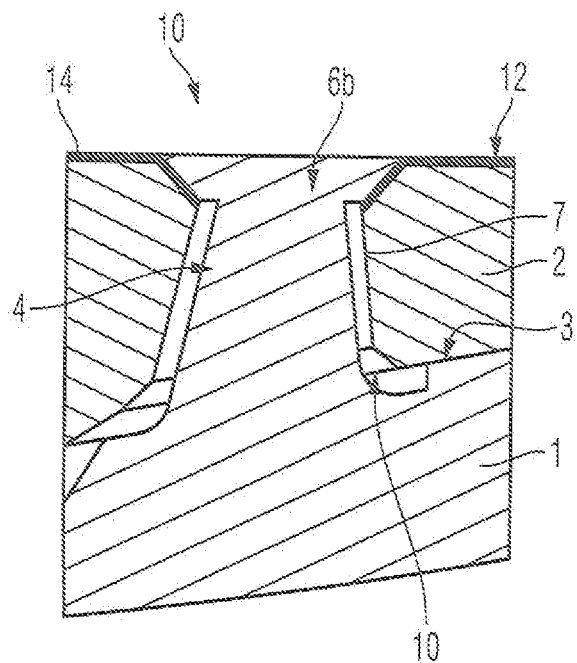
FIG. 6 shows a sectional view associated with FIG. 5.

FIG. 5 is a top view of the rivet 4 of the first component 1 inserted in the method according to the embodiment into the rivet hole 7 of the second component 2, and subsequent to heat staking the free end 6a, which is shown in FIG. 4, of the rivet 4 to form a rivet head 6b. FIG. 6 is a sectional view associated with FIG. 5. Thus, the assembly 10 according to the embodiment of the first component 1 and the second component 2 fixed to the first component 1 is formed, which is shown only in part in the FIGS. 5 and 6. For example, the heat staking is carried out by indirectly heating the rivet 4, or the free end 6a thereof shown in FIG. 4, by means of a heated stamp being in touching contact with the free end 6a, wherein the stamp is heated by hot air or heat radiation, or by the free end 6a of the rivet 4 being directly heated and molded by hot air, ultrasound or heat radiation.

The structure in the rivet head accommodating portion 8 ensures that the rivet head 6b is additionally fixed to the second component without a substance-to-substance connection between the rivet 4 and the second component 2 being required. Thus, the rivet 4 is non-rotatably fixed by the structure of the rivet head accommodating portion 8. The structure is a wave-shaped toothing with a sequence of teeth and interposed tooth troughs. During heat staking, the rivet head accommodating portion 8 serves as a molding tool for the material of the free end of the rivet 4, so that the formed rivet head 6b is positively accommodated in the structured rivet head accommodating portion 8. During heat staking, the metallic layer 14 of the second component 2 formed by metallic coating in, amongst others, the rivet head accommodating portion 8 serves for heat dissipation in order to avoid thermal deformation of the second component 2. The structured rivet head accommodating portion 8 and the heat-staked rivet head 6b form a spline connection that is formed circumferentially around the rivet hole outlet.

The rivet head accommodating portion 8 is formed so as to be conically tapering in the direction of the rivet hole inlet 10, in order to create a biased and thus non-positive fixing of the second component 2 on the rivet of the first component 1 between the rivet head 6b and the abutting surface 3, which is caused by the material shrinkage when the thermoplastic rivet 4 solidifies. After heat staking, the rivet head 6b is accommodated in the depression formed by the rivet hole accommodating portion 8 in its entirety and flush with the second surface 12 of the second component 2 in order to avoid mechanical damage to an otherwise protruding rivet head 6b, or to attain a visually attractive appearance.

What is claimed is:

1. A method for joining a first component formed of a thermoplastic material having formed integral therewith a rivet formed of the thermoplastic material with a second component having a rivet hole, wherein the rivet hole forms a rivet hole inlet in a first surface of the second component and a rivet hole outlet in a second surface of the second component, and wherein the second component forms in the second surface a structured rivet head accommodating portion having an inlet and an outlet and being disposed in a region of the rivet hole outlet, wherein at least one of: the structured rivet head accommodating portion and at least the second surface is metal-coated so that a substance-to-substance connection between the first component and the second component is not obtainable, the method comprising:

inserting a free end of the rivet via the rivet hole inlet into the rivet hole until a unilaterally abutting, inserted position of the rivet reaching through the rivet hole is reached; and heat staking the free end of the rivet in the inserted position while forming a rivet head, so that the rivet head is at least partially accommodated in the structured rivet head accommodating portion, in order to fix the second component to the first component;

wherein the structured rivet head accommodating portion forms a molding tool during heat staking, so that a heat-staked rivet head is positively accommodated in the structured rivet head accommodating portion;

wherein the rivet has a base portion tapering conically in a direction of its free end; and wherein the structured rivet head accommodating portion is formed so as to be conically tapering in the direction of the rivet hole inlet so that the structured rivet head accommodating portion inlet is narrower than the rivet head accommodating portion outlet.

2. The method of claim 1, wherein the structured rivet head accommodating portion and the heat-staked rivet head form a spline connection.

3. The method of claim 1, wherein the structured rivet head accommodating portion is formed with a wave-shaped structure in its surface.

4. The method of claim 3, wherein the wave-shaped structure in the surface of the structured rivet head accommodating portion has a wave-shaped toothing with a sequence of teeth and interposed tooth troughs.

5. The method of claim 1, wherein the structured rivet head accommodating portion is formed by a depression surrounding the rivet hole outlet in the second surface of the second component, and the rivet head is accommodated in the depression in its entirety after heat staking.

6. The method of claim 5, wherein the rivet head, after the heat staking, is accommodated flush with the second surface in the depression.

7. An assembly of a first component and a second component fixed to the first component comprising;
- a first component formed of a thermoplastic material having formed integral therewith a rivet formed of the thermoplastic material; and
- a second component having a rivet hole, wherein the rivet hole forms a rivet hole inlet in a first surface of the second component and a rivet hole outlet in a second surface of the second component, and wherein the second component forms in the second surface a structured rivet head accommodating portion having an inlet and an outlet and being disposed in a region of the rivet hole outlet, wherein at least one of: the structured rivet head accommodating portion and at least the second surface is metal-coated so that a substance-to-substance connection between the first component and the second component is not obtainable; wherein the rivet is inserted into the rivet hole and disposed so as to reach through the rivet hole and forms at its free end a rivet head that is at least partially accommodated in the structured rivet head accommodating portion;
- wherein the rivet has a base portion tapering conically in the direction of its rivet head;
- wherein the rivet head is positively accommodated in the structured rivet head accommodating portion; and
- wherein the structured rivet head accommodating portion is formed so as to be conically tapering in the direction of the rivet hole inlet so that the structured rivet head accommodating portion inlet is narrower than the structured rivet head accommodating portion outlet.

8. The assembly of claim 7, wherein the structured rivet head accommodating portion and the rivet head form a spline connection.

9. The assembly of claim 7, wherein the structured rivet head accommodating portion is formed with a wave-shaped structure in its surface.

10. The assembly of claim 9, wherein the wave-shaped structure in the surface of the structured rivet head accommodating portion has a wave-shaped toothing with a sequence of teeth and interposed tooth troughs.

11. The assembly of claim 7, wherein the structured rivet head accommodating portion is formed by a depression surrounding the rivet hole outlet in the second surface of the second component, and the rivet head is accommodated in the depression in its entirety.

12. The assembly of claim 11, wherein the rivet head is accommodated flush with the second surface in the depression.

13. A motor vehicle comprising the assembly of claim 7.

* * * * *